United States Patent [19]

Saikaishi et al.

[11] 3,798,600

[45] Mar. 19, 1974

[54] METHOD AND SYSTEM OF REMOTE CONTROL

[75] Inventors: Noboru Saikaishi, Tokyo; Shigeharu Takamatsu, Sagamihara, both of Japan

[73] Assignee: Trio Electronics Incorporated, Tokyo, Japan

[22] Filed: Sept. 11, 1972

[21] Appl. No.: 287,857

[52] U.S. Cl. .................................. 340/148, 343/225

[51] Int. Cl. .............................................. H04q 9/00

[58] Field of Search .......... 340/171 R, 171 PF, 148; 307/233; 325/391, 392; 343/225, 228; 329/142

[56] References Cited

UNITED STATES PATENTS

| | | | |
|---|---|---|---|
| 3,202,967 | 8/1965 | Wolff | 340/171 R |
| 3,319,225 | 5/1967 | Anderson et al. | 340/171 R X |
| 3,638,038 | 1/1972 | Weber | 307/233 |
| 3,667,062 | 5/1972 | White | 329/142 |

*Primary Examiner*—Donald J. Yusko
*Attorney, Agent, or Firm*—Charles E. Pfund; Chittick, Thompson & Pfund

[57] ABSTRACT

Control waves having different frequencies are generated and successively transmitted from a transmitter. The control waves are received at a receiver and are applied to a frequency discriminator which generates positive, negative and zero voltages in response to the frequencies of the received control waves for generating three control signals which are used to control a controlled device.

4 Claims, 3 Drawing Figures

METHOD AND SYSTEM OF REMOTE CONTROL

BACKGROUND OF THE INVENTION

This invention relates to a method and system of remote control wherein a plurality of control waves having different frequencies and in the form of ultrasonic sound waves, electromagnetic waves or electric waves are used to remotely control three controlled systems such as control elements of a radio receiver or other electric machines and apparatus.

Prior art remote control systems are relatively complicated because pulses or modulated signals have been used for the purpose of avoiding missoperations caused by noise signals or the like.

SUMMARY OF THE INVENTION

Accordingly, it is an object of this invention to provide an improved method and system of remote control which are simple in construction and wherein the received signals are converted into three control signals which are used to perform the desired remote control operations.

Briefly stated, according to this invention three control waves are sequentially generated in a transmitter and are successively transmitted to a receiver. Control waves received by the receiver are applied to a frequency discriminator. Where signals having frequencies in the operating range of the frequency discriminator are received a positive voltage, a negative voltage or a zero voltage are produced by the frequency discriminator, the zero output voltage corresponding to a received control wave having a frequency corresponding to the center frequency of the frequency discriminator. Thus, when a positive voltage is produced, a first control signal is obtained whereas when a negative voltage is produced a second control signal is produced. On the other hand, where a control wave having a frequency equal to the center frequency or equal to a frequency on the outside of the operating range of the frequency discriminator is received the discriminator produces a zero output voltage so that neither the first or the second control signal is produced but a third control signal is produced. In this manner, the ultrasonic sound waves or electromagnetic waves which are transmitted suc-cessively are converted into either one of the first, second and third control signals which are used to operate relays, for example, in the controlled system.

According to another aspect of this invention there is provided a remote control system comprising a transmitter and a receiver, the transmitter including a source of control waves for generating control waves having different frequencies and means for successively transmitting the control waves having different frequencies toward the receiver, and the receiver including a frequency discriminator for generating a positive voltage and a negative voltage in response to received control waves having frequencies within the operating range but respectively higher than and lower than the center frequency of the operating range of the frequency discriminator, means to generate a zero voltage in response to a control wave having a frequency equal to the center frequency of the operating range and to frequencies on the outside of the operating range of the frequency discriminator.

BRIEF DESCRIPTION OF THE DRAWINGS

The invention can be more fully understood from the following detailed description taken in conjunction with the accompanying drawings in which.

DESCRIPTION OF THE PREFERRED EMBODIMENT

Figure 1:
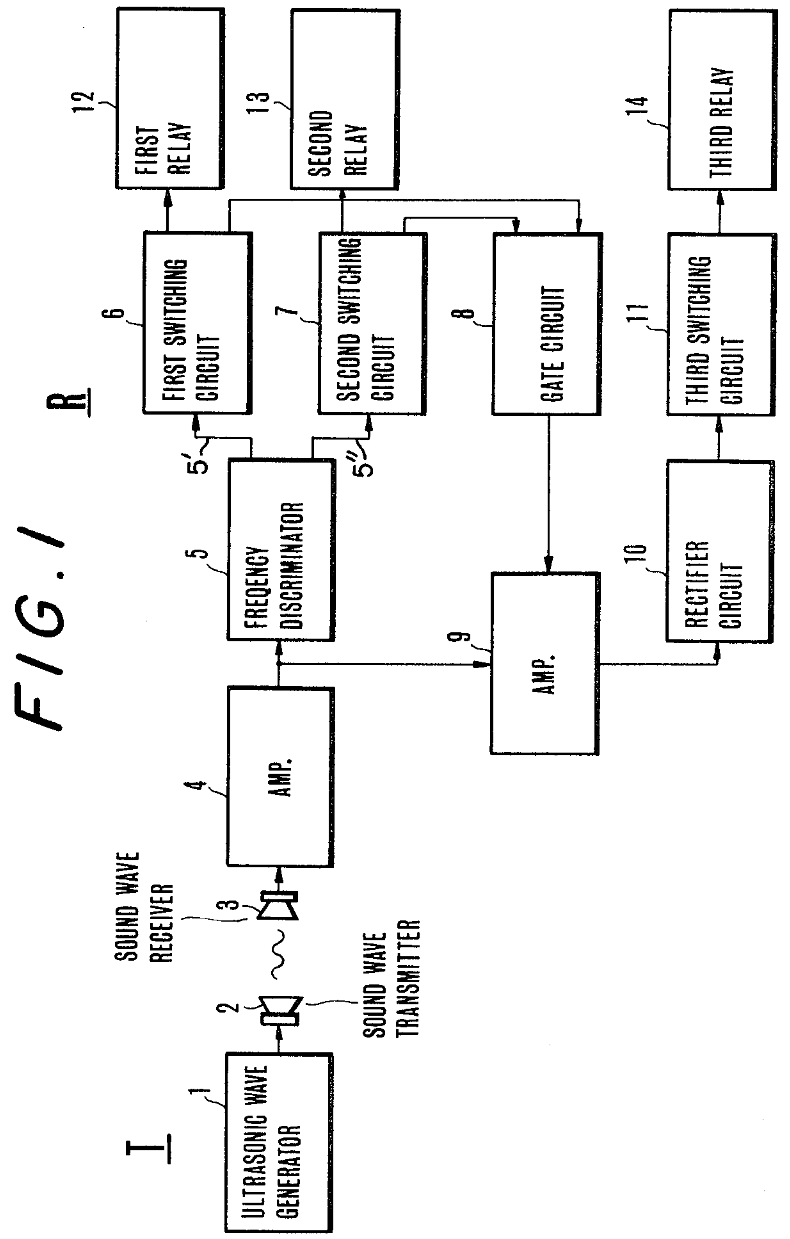
FIG. 1 is a block diagram showing one embodiment of a remote control system embodying the invention.

The remote control system shown in FIG. 1 comprises a transmitter T including an oscillator 1 shown as an ultrasonic sound wave generator and a sound wave transmitter 2 and a receiver R including a sound wave receiver 3 connected to an amplifier 4 and a frequency discriminator 5 connected to the output of the amplifier 4. The output of the frequency discriminator 5 is applied to a first relay 12 and a second relay 13 through a first switching circuit 6 and a second switching circuit 7, respectively. The output from amplifier 4 is also supplied to a third relay 14 through an amplifier 9, a rectifier circuit 10 and a third switching circuit 11. Further, the output from the first and second switching circuits 6 and 7 are applied to the input of amplifier 9 via a gate circuit 8.

A plurality of ultrasonic sound waves having different frequencies produced by the ultrasonic wave generator 1 are radiated successively through the sound wave transmitter 2. The radiated sound waves or control waves are received by the sound wave receiver 3 and are then impressed upon the frequency discriminator 5 through amplifier 4. The frequency discriminator 5 is designed such that when it is supplied with received signals having frequencies in the operating range thereof it produces opposite polarity detected outputs, that is DC outputs having the so-called S characteristic as is well known in the art of frequency discriminators. Where the DC output 5′ of the S characteristic is a positive voltage this output voltage is impressed via line 5′ upon the first switching circuit 6 to produce a first control signal on the output thereof for controlling the first relay 12 in the controlled system. On the other hand, when the DC output of the S characteristic is a negative voltage, this output voltage is impressed via line 5″ upon the second switching circuit 7 to produce a second control signal on the output thereof for controlling the second relay 13 in the controlled system.

The ON-OFF operation of the amplifier 9 is controlled by the output from the gate circuit 8. More particularly, in the absence of the output from the gate circuit 8 the amplifier 9 is turned OFF, whereas in the presence of the output from the gate circuit 8, the amplifier 9 is turned ON. The gate circuit 8 functions to provide an output when both of said first and second control signals are not produced by the first and second switching circuits 6 and 7, whereas it does not provide an output whenever either one of the first and second control signals is produced. These conditions show that the received ultrasonic sound waves have a frequency equal to the center frequency of the operating range of the frequency discriminator or a frequency on the outside of the operating range of the frequency discriminator. As a result where the received signal has a frequency within the operating range of the frequency discriminator 5 either the first or the second control signal will be generated so that there would be no output from the gate circuit 8 whereby the amplifier 9 will be turned OFF. On the other hand, when the received signal has a frequency equal to the center frequency of the frequency discriminator or to a frequency on the outside of the operating range thereof both first and second control signals will not be produced. Accordingly, the gate circuit 8 produces an output whereby turning ON the amplifier 9 and when amplifier 4 supplies an input signal thereto (at the center frequency of discriminator 5), the output from amplifier 9 actuates the third relay 14 through rectifier circuit 10 and the third switching circuit 11.

In this manner, a plurality of successively transmitted signal waves having different frequencies are converted into either one of the first, second and third control signals thereby enabling remote control of the controlled system.

Although in the above illustrated example ultrasonic sound waves are used as control waves, it should be understood that it is also possible to use electromagnetic waves or electric waves as the control waves.

The detail of the transmitter T and receiver R will now be described with reference to FIGS. 2 and 3.

Figure 2:
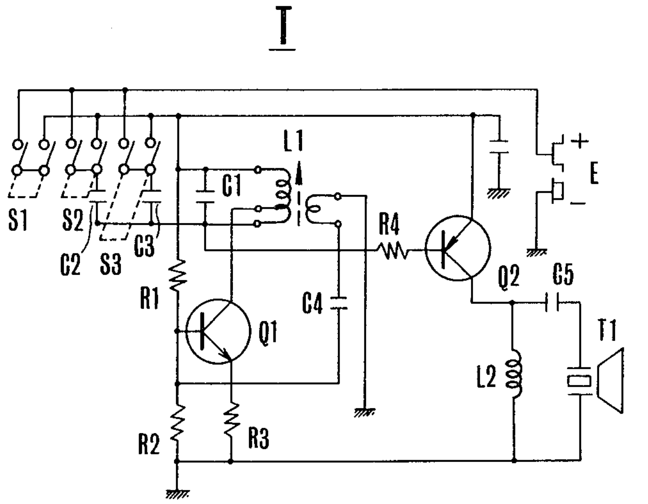
FIG. 2 is a connection diagram of the transmitter used in the remote control system shown in FIG. 1

The transmitter T shown in FIG. 2 comprises a transistor $Q_1$ which functions as a collector tuning type oscillator. A parallel resonance circuit including the primary winding of a tuning coil $L_1$ and a capacitor $C_1$ is connected to the collector electrode of the transistor $Q_1$ whereby the oscillator oscillates at a frequency determined by the inductance of the primary winding and the capacitance of the capacitor $C_1$. Capacitors $C_2$ and $C_3$ having different capacitances are connected in parallel with the parallel resonance circuit by means of switches $S_2$ and $S_3$ adapted to connect a source of supply E with the transmitter T. A switch $S_1$ is also adapted to connect the source of supply E with the transmitter T, whereby the oscillator can oscillate at different frequencies. For example, the oscillator generates a frequency of 39.2 KHz when the switch $S_1$ is closed, and frequencies of 40.0 KHz and 40.8 KHz when the switches $S_2$ and $S_3$ are closed respectively. A portion of the output of the oscillator is positively fed back to the base electrode of transistor $Q_1$ from the secondary winding of the tuning coil $L_1$ through a capacitor $C_4$ thereby maintaining the oscillation. The output of the oscillator is taken out from the juncture between tuning coil $L_1$ and capacitor $C_1$ and is then applied to the base electrode of an amplifier transistor $Q_2$ via a resistor $R_4$. The emitter electrode of transistor $Q_2$ is connected to the source through either one of the switches $S_1$, $S_2$ and $S_3$ while the collector electrode is grounded through a coil $L_2$. The amplified output appearing on the collector electrode of transistor $Q_2$ is supplied to an electro-acoustic transducer $T_1$ through a DC blocking capacitor $C_5$. The electro-acoustic transducer $T_1$ converts the outputs of the oscillator having frequencies of 39.2 KHz, 40.0 KHz and 40.8 KHz respectively into ultrasonic sound waves of only one such frequency when either one of the switches $S_1$, $S_2$ and $S_3$ is closed. The sound wave is radiated toward the receiver. Thus, the ultrasonic sound wave would not be radiated when all switches are open.

Figure 3:
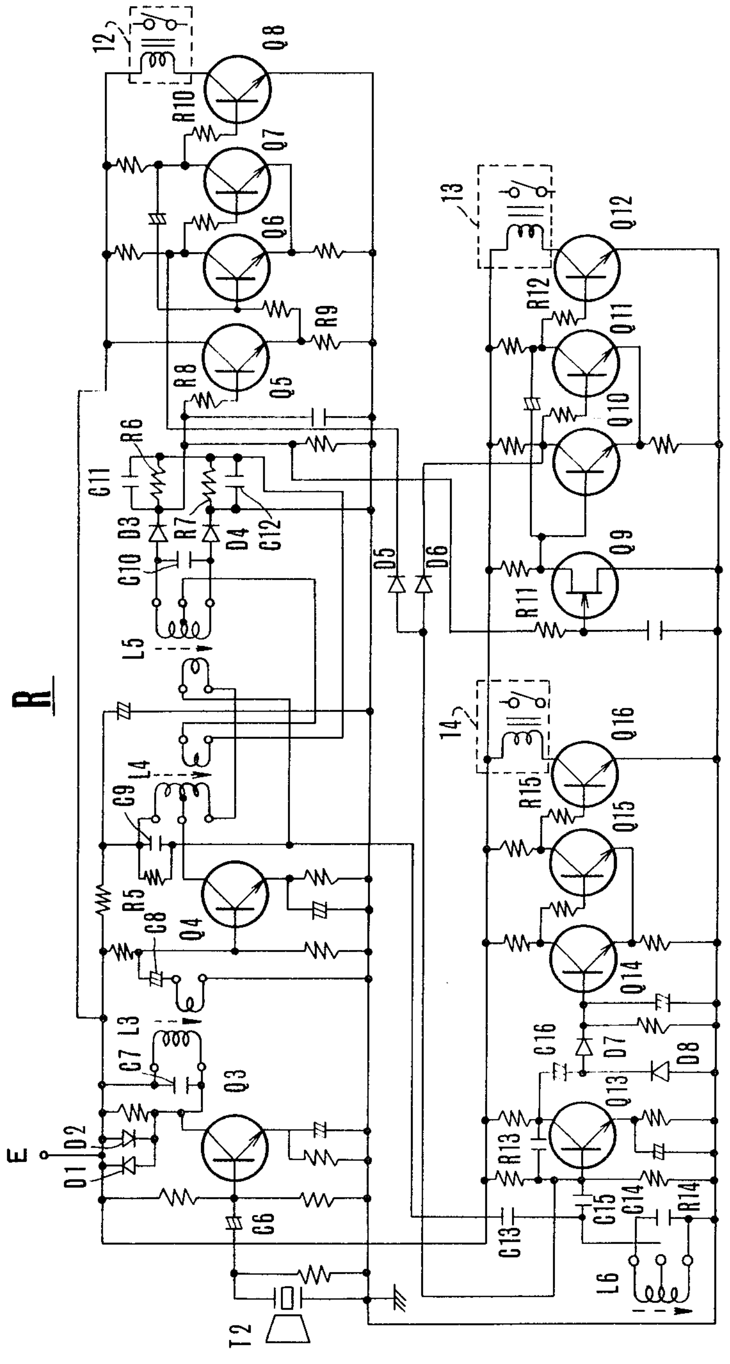
FIG. 3 is a connection diagram of the receiver used in the remote control system shown in FIG. 1.

The receiver R shown in FIG. 3 comprises an acoustic-electro converter $T_2$ which acts to convert ultrasonic sound waves which are successively transmitted from the transmitter into electric signals which are coupled to the base electrode of a transistor $Q_3$ through a coupling capacitor $C_6$. A nonvariable parallel tuning circuit comprising the primary winding of a tuning coil $L_3$ and a capacitor $C_7$ connected in parallel therewith is connected to the collector electrode of transistor $Q_3$. The parallel tuning circuit is adjusted to tune to the frequency of 40.0 KHz but to have a bandwidth sufficient to trap signals of 39.2 KHz, 40.0 KHz and 40.8 KHz, respectively, sent from the transmitter. Accordingly, these three signals sent from the transmitter are amplified by transistor $Q_3$ and applied to the base electrode of an amplifier transistor $Q_4$ in the next stage from the secondary winding of the tuning coil $L_3$ through a coupling capacitor $C_8$. A pair of diodes $D_1$ and $D_2$ connected in parallel opposition between the collector electrode of transistor $Q_3$ and the source E function to limit the amplitude of the received signals. Similar to the proceding stage a tuning circuit is included on the collector electrode side of transistor $Q_4$. The tuning circuit comprises a series combination of the primary windings of tuning coils $L_4$ and $L_5$ and a capacitor $C_9$ and a resistor $R_5$ which are connected in parallel with the series combination, and is constructed to have the same bandwidth as the tuning circuit in the preceding stage. A capacitor $C_{10}$ is connected across the secondary winding of the tuning coil $L_5$ to form a tuning circuit tuned to the frequency of 40.0 KHz. The secondary winding of the tuning coil $L_5$ is provided with a mid-tap and a pair of end terminals which are connected to parallel combinations of resistors $R_6$, $R_7$ and capacitors $C_{11}$, $C_{12}$ respectively through diodes $D_3$ and $D_4$ of the same polarity. The secondary winding of the tuning coil $L_4$ is connected across the mid-tap of the secondary winding of the tuning coil $L_5$ and the common juncture between said parallel combinations. The secondary windings of the tuning coils $L_4$ and $L_5$ and diodes $D_3$ and $D_4$ cooperate to constitute a Foster-Seeley type frequency discriminator. The juncture between diode $D_4$ and the parallel combination of resistor $R_7$ and capacitor $C_{12}$ is grounded and the output of the frequency discriminator is taken out from the juncture between diode $D_3$ and the parallel combination of resistor $R_6$ and capacitor $C_{11}$. When an input signal of a frequency of 40.0 KHz is applied to the frequency discriminator, its output is zero because this frequency coincides with the center frequency of the operating range of the discriminator. When the frequency of the input signal is equal to 39.2 KHz which is smaller than the center frequency but within the operating range, the secondary side of the tuning coil $L_5$ becomes capacitive thereby producing a negative output from the discriminator. Further, when the frequency of the input signal is equal to 40.8 KHz which is higher than the center frequency but within the operating range, the secondary side of the tuning coil $L_5$ becomes inductive thereby producing a positive voltage.

The output from the Foster-Seeley type frequency discriminator is applied to the gate electrode of a field effect transistor $Q_9$ through a resistor $R_{11}$ and to the base electrode of a transistor $Q_5$ through a resistor $R_8$. The receiver R is constructed such that under a normal condition, transistor $Q_5$ is maintained OFF, transistor $Q_6$ constituting a first Schmidt circuit is maintained OFF, transistor $Q_7$ ON, transistor $Q_8$ OFF, field effect transistor $Q_9$ ON, transistor $Q_{10}$ constituting a second Schmidt circuit OFF, transistor $Q_{11}$ ON and transistor $Q_{12}$ OFF.

To have more clear understanding of the invention, three conditions of the frequency discriminator which produce a zero output voltage, a positive output voltage and a negative output voltage respectively will be considered hereunder independently.

Where the received ultrasonic sound wave signal has a frequency of 40.0 KHz and the output from the frequency discriminator is zero, as this condition corresponds to the normal condition, both transistors $Q_8$ and $Q_{12}$ are maintained OFF so that first and second relays 12 and 13 respectively connected to the collector electrodes of these transistors would not be energized.

Where the received ultrasonic sound wave has a frequency of 40.8 KHz so that the frequency discriminator produces a positive output, since the field effect transistor $Q_9$ is maintained ON when the positive voltage is impressed upon the gate electrode thereof, transistor $Q_{12}$ continues to maintain its OFF state in the same manner as under the normal condition, whereby the second relay 13 will not be energized. However, when a positive voltage is impressed upon the base electrode of transistor $Q_5$ through resistor $R_8$, transistor $Q_5$ is turned ON to pass current through a resistor $R_9$ connected to the emitter electrode and the voltage drop across resistor $R_9$ is applied to the base electrode of transistor $Q_6$ thereby reversing the operation of the first Schmidt circuit. Thus, transistor $Q_6$ is turned ON, whereas transistor $Q_7$ is turned OFF. This increases the collector potential of transistor $Q_7$ with the result that the potential applied to the base electrode of transistor $Q_8$ through a resistor $R_{10}$ is also increased to turn ON transistor $Q_8$ whereby current is supplied to the first relay 12 to operate the same.

On the other hand, where the received ultrasonic sound wave signal has a frequency of 39.2 KHz so that the frequency discriminator produces a negative voltage, transistor $Q_5$ will maintain its OFF state in the same manner as under the normal condition because this transistor $Q_5$ will not be turned ON when the negative voltage is impressed upon its base electrode through resistor $R_8$ so that the first relay 12 is not actuated. However, application of the negative voltage upon the gate electrode of the field effect transistor $Q_9$ via resistor $R_{11}$ turns OFF this field effect transistor thus increasing the potential of its drain electrode. This increased potential is impressed upon the base electrode of transistor $Q_{10}$ to reverse the operation of the second Schmidt circuit thus turning ON transistor $Q_{10}$ and OFF transistor $Q_{11}$. Consequently, the collector potential of transistor $Q_{11}$ increases to increase the base potential of transistor $Q_{12}$ through resistor $R_{12}$ thus turning ON transistor $Q_{12}$. As a result, current is supplied to second relay 13 to actuate the same.

As above described the first relay 12 is actuated only when a signal of 40.8 KHz is received but not when signals of 39.2 KHz and 40.0 KHz are received. On the other hand, the second relay 13 is actuated only when a signal of 39.2 KHz is received but not when signals of 40.0 KHz and 40.8 KHz are received.

In addition to being applied to the frequency discriminator, the received signal amplified by transistor $Q_4$ is also applied to the base electrode of a transistor $Q_{13}$ in another amplifier stage through coupling capacitors $C_{13}$ and $C_{15}$. A narrow bandwidth trap circuit tuned to a frequency of 40.0 KHz is connected between the juncture between capacitors $C_{13}$ and $C_{15}$ and the ground. The trap circuit comprises a tuning coil $L_6$ and a capacitor $C_{14}$ connected in parallel therewith and is constructed to have a narrow bandwidth characteristic so that it can trap a signal of 40.0 KHz but attenuates signals of 39.2 KHz and 40.8 KHz respectively. A diode $D_5$ is connected between the base electrode of transistor $Q_{13}$ and the collector electrode of one transistor $Q_6$ of the first Schmidt circuit with a polarity to pass current toward transistor $Q_6$. Further, a diode $D_6$ of the same polarity as diode $D_5$ is connected between the base electrode of transistor $Q_{13}$ and the collector electrode of one transistor $Q_{10}$ of the second Schmidt circuit.

When a received ultrasonic sound signal having a frequency of 40.0 KHz is applied to the base electrode of transistor $Q_{13}$, the collector voltage of transistors $Q_6$ and $Q_{10}$ becomes equal to the source voltage because at this time transistors $Q_6$ and $Q_{10}$ are in their OFF state thereby turning OFF diodes $D_5$ and $D_6$. As a result, a bias voltage derived from a potentiometer constituted by resistors $R_{13}$ and $R_{14}$ is impressed upon the base electrode of transistor $Q_{13}$ thus causing it to operate as an amplifier. However, when the received ultrasonic sound wave signal has a frequency of 39.2 KHz, transistor $Q_{10}$ is turned ON so that its collector potential is decreased to turn ON the diode $D_6$. Accordingly, even when a signal of 39.2 KHz that has not been completely attenuated by the narrow bandwidth trap circuit appears on the base electrode of transistor $Q_{13}$, this signal is by-passed to transistor $Q_{10}$ via diode $D_6$, so that this signal would not be amplified by transistor $Q_{13}$.

When the received ultrasonic sound wave signal has a frequency of 40.8 KHz the transistor $Q_6$ is turned ON with the result that its collector potential is decreased thus turning ON diode $D_5$. Accordingly, even if a signal of 40.8 KHz that has not been completely attenuated by the narrow bandwidth trap circuit appears on the base electrode of transistor $Q_{13}$ this signal will be bypassed toward transistor $Q_6$ through diode $D_5$ thus preventing transistor $Q_{13}$ from acting as an amplifier.

Accordingly, among received ultrasonic sound wave signals only the signal having a frequency of 40.0 KHz is amplified by transistor $Q_{13}$. The 40.0 KHz signal amplified by transistor $Q_{13}$ is applied to a rectifier circuit including diodes $D_7$ and $D_8$ through a capacitor $C_{16}$ and the rectified DC voltage is impressed upon the base electrode of a transistor $Q_{14}$, one of the elements constituting a third Schmidt circuit. The third Schmidt circuit is designed such that, under the normal condition, transistor $Q_{14}$ is OFF, transistor $Q_{15}$ is ON and transistor $Q_{16}$ is OFF, with the result that the third relay 14 will not be operated. When the rectified voltage of the 40.0 KHz signal is impressed upon the base electrode of transistor $Q_{14}$, the operation of the third Schmidt circuit is reversed thereby turning ON transistor $Q_{14}$ and OFF transistor $Q_{15}$. This increases the collector potential of transistor $Q_{15}$ which in turn increases the base potential of transistor $Q_{16}$ thus turning ON the same. As a result, current is supplied to the third relay 14 to actuate the same.

In this manner, the third relay 14 is actuated only when the 40.0 KHz signal is received but not operated when signals of 39.2 KHz and 40.8 KHz are received.

As above described, when a 40.8 KHz signal is received, only the first relay 12 is operated, and when a 39.2 KHz signal is received the second relay 13 alone is operated whereas when a signal of 40.0 KHz is received only the third relay 14 is operated. According, by associating the first to third relays with objects to be remotely controlled, for example, the component parts of a radio receiver desired to be switched remotely it is possible to selectively operate the controlled objects by selecting the frequency of the ultrasonic sound wave transmitted.

It should be understood that the novel remote control system can be equally applied to other various applications than the control of relays. For example, it is possible to light three display lamps, to start and stop an electric motor by a first control signal and to change the direction of rotation thereof by the second and third control signals. When applied to the remote control of a radio receiver, the first control signal may be used to drive in the forward direction the driving motor of a volume adjuster to increase the volume, the second control signal to drive the motor in the opposite direction to decrease the volume and the third signal to drive a tuning mechanism of the automatic or preset tuning type, for example. While the volume is being adjusted by the first or second control signal, since there is no third control signal the broadcasting station that has already been tuned is kept locked so that such a station is unlocked while volume is not being adjusted and the broadcasting stations are selected by the third control signal.

Although the invention has been shown and described in terms of a preferred embodiment thereof, it should be understood that the invention is by no means limited to the particular embodiment illustrated and that many changes and modifications will readily occur to one skilled in the art without departing from the true spirit and scope of the invention as defined in the appended claims.

What is claimed is:

1. A method of remote control comprising the steps of generating control waves of different frequencies at a transmitter, successively transmitting said control waves from said transmitter, receiving said control waves at a receiver, frequency discriminating among the received control waves to generate a positive, a negative and a zero voltage in response to the respective frequencies of said received control waves, generating first and second control signals in response to said positive and negative voltages, respectively, and generating a third control signal in response to said zero voltage and the presence of its respective frequency as a received control wave when both of said first and second control signals are not generated.

2. The method according to claim 1 wherein said control waves are ultrasonic sound waves.

3. A remote control system comprising a transmitter and a receiver, said transmitter including a source of control waves for generating control waves having different frequencies and means for successively transmitting said control waves having different frequencies toward said receiver, and said receiver including a frequency discriminator for generating a positive voltage and a negative voltage in response to received control waves having frequencies within the operating range of said frequency discriminator but respectively higher than and lower than the center frequency of the operating range of said frequency discriminator, means for generating a zero voltage in response to a control wave having a frequency equal to the center frequency of the operating range and to frequencies on the outside of the operating range of said frequency discriminator and means for producing three respective control signals in response to said positive and negative voltages and to said zero voltage in the presence of a signal of said center frequency.

4. The remote control system according to claim 3 wherein said receiver comprises a first amplifier for amplifying the received control waves, a frequency discriminator responsive to the output from said first amplifier for producing a positive voltage and a negative voltage when the frequency of the received control wave is higher than and lower than the center frequency of the operating range of said frequency discriminator, means responsive to said positive voltage for producing a first control signal, means responsive to said negative voltage for producing a second control signal, a second amplifier connected to the output of said first amplifier, a gate circuit responsive to said positive and negative voltages for controlling said second amplifier to be enabled in the absence of both said positive and negative voltages, and means responsive to the output of said second amplifier for generating a third control signal.

* * * * *